United States Patent [19]

Randolph, Jr.

[11] 4,344,034
[45] Aug. 10, 1982

[54] SELECTIVE/GROUND NEUTRALIZING METAL DETECTOR

[75] Inventor: Byron B. Randolph, Jr., Phoenix, Ariz.

[73] Assignee: Robert F. Gardiner, Phoenix, Ariz.

[21] Appl. No.: 146,455

[22] Filed: May 5, 1980

[51] Int. Cl.³ .............................................. G01V 3/11
[52] U.S. Cl. .................................................. 324/329
[58] Field of Search ............................... 324/329, 233

[56] References Cited

U.S. PATENT DOCUMENTS

| | | | |
|---|---|---|---|
| 3,337,796 | 8/1967 | Hentschel et al. | 324/233 |
| 3,826,973 | 7/1974 | Pflaum | 324/329 |
| 4,030,026 | 6/1977 | Payne | 324/329 |
| 4,096,432 | 6/1978 | Spencer | 324/329 |
| 4,110,679 | 8/1978 | Payne | 324/329 |
| 4,128,803 | 12/1978 | Payne | 324/329 |
| 4,249,129 | 2/1981 | Karbowski | 324/329 |

FOREIGN PATENT DOCUMENTS 1534039  11/1978  United Kingdom ................ 324/329

Primary Examiner—Gerard R. Strecker
Attorney, Agent, or Firm—Cahill, Sutton & Thomas

[57] ABSTRACT

A metal detector circuit derives a first sine wave signal in response to metal objects in proximity to the search head. A second sine wave signal at the operating frequency of the circuit is applied to a center tapped inductor. The initial and final turns of the inductor are connected through a system of capacitors, resistors, and diodes so that conduction occurs during a brief period of each cycle of the applied sine wave. The electrical switching action thus afforded is used to charge a capacitor to the instantaneous voltage of a specified component of the first sine wave. A phase shift network provides a means of adjustment of the phase angle at which switching occurs, to permit a predetermined component of the first sine wave to be detected. When the proper component of the first sine wave is detected, a selective or discriminatory response may be derived, resulting in signals of opposite polarity for high Q objects, such as coins, and low Q objects, such as aluminum pull tabs.

In addition, a metal detector system is presented wherein two of the detector circuits of the invention are advantageously combined so that the output is both selective and ground neutralized. In this system, a first detector circuit provides a selective response to metal objects. A second detector circuit provides a response to metal objects, while excluding ground effects. A clamping circuit controlled by the second detector circuit removes ground effects from the output of the first detector circuit.

7 Claims, 7 Drawing Figures

SELECTIVE/GROUND NEUTRALIZING METAL DETECTOR

BACKGROUND OF THE INVENTION

In recent years, numerous metal detector circuits have been developed to provide a selective or discriminatory response to metal objects in proximity to the search head. As a result of the greater resistive component of the signals produced by low Q objects, such as aluminum pull tabs and the small resistive component of the signals produced by high Q objects, such as coins, a circuit which detects the proper component of the received signal will produce a response of opposite polarity for these objects.

In addition, numerous circuits have been developed for the purpose of excluding the effects of ferromagnetic minerals, such as magnetite, resulting in a ground neutralizing detector system. In these systems, the circuit is adjusted so that the component of the received signal caused by ferromagnetic minerals is not detected, resulting in a ground neutralized response.

The design problems inherent to both selective and ground neutralizing detector circuit are similar. Of primary concern is the ability of the circuit to provide a consistent response despite changes in the quiescent input signal within the detector circuit. These changes may be caused by temperature changes, aging of components, or large quantities of ferromagnetic minerals in proximity to the search head. In addition, the circuit should not require critical adjustment or component selection to enable ease of construction and to insure reliability.

It is therefore an object of the present invention to provide a selective or ground neutralizing detector circuit which will operate reliably, which may be constructed economically and which will not require critical adjustment.

It is another object of the present invention to provide a metal detector circuit incorporating a switching circuit to enable the detector to neutralize the effects of ferromagnetic minerals.

It is still another object of the present invention to provide a metal detector having a switching circuit which may be utilized to provide selectively for the identification of detected objects in accordance with the Q of such objects.

It is still another object of the present invention to provide a metal detector system utilizing a clamping circuit, controlled by a ground neutralizing detector circuit, for the purpose of removing the effects of ferromagnetic minerals from the response of a selective detector circuit.

These and other advantages of the present invention will become apparent to those skilled in the art as the description thereof proceeds.

The present invention may more readily be described by reference to the accompanying drawings, in which.

Figure 1:
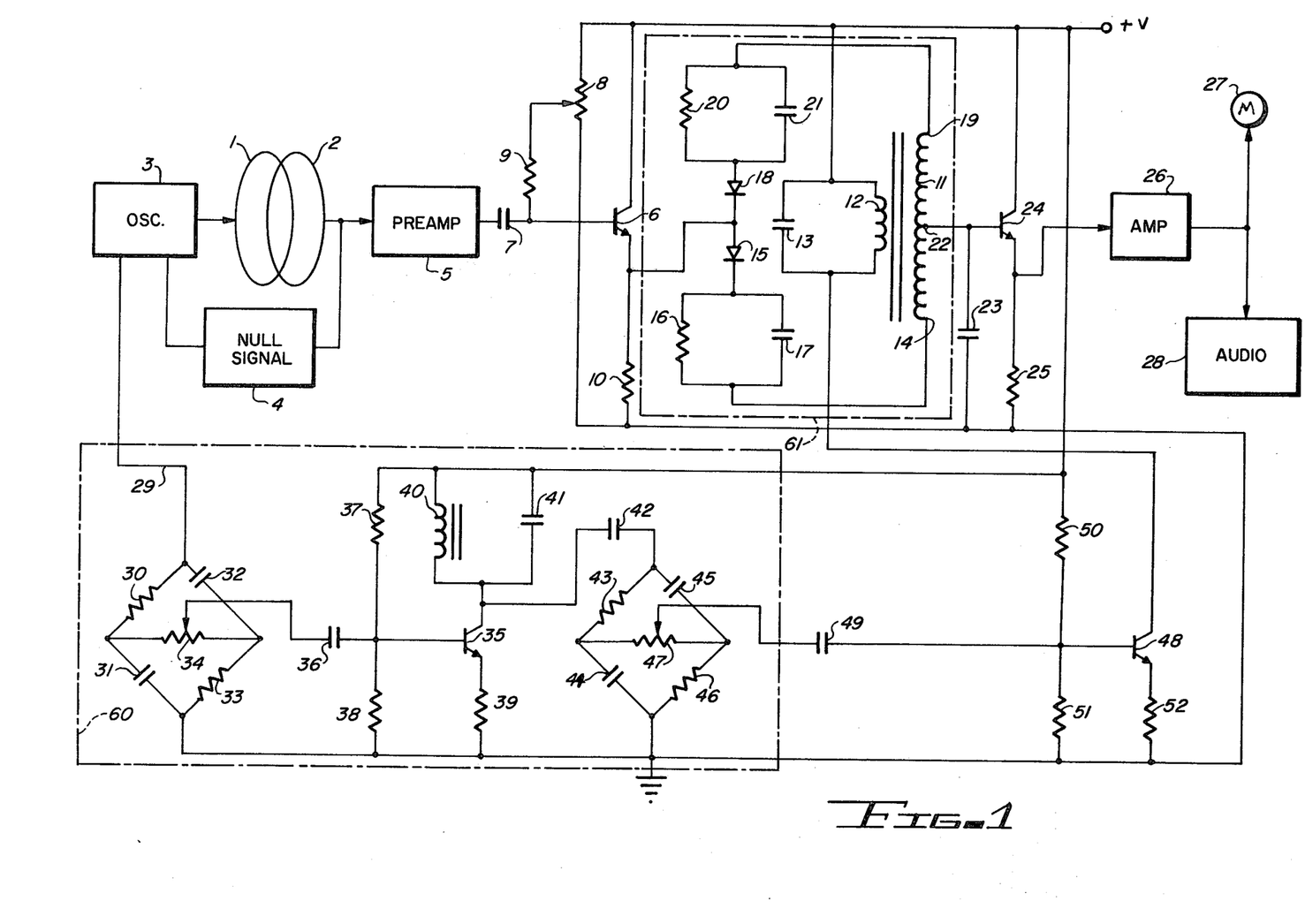
FIG. 1 is a schematic circuit diagram of a metal detector constructed in accordance with the teachings of the present invention.

Referring now to the drawings, and particularly to FIG. 1, a transmitter coil 1 and a receiver coil 2 are located in a conventional manner typical in metal detector art.

Oscillator 3 supplies a sine wave signal with a frequency of 6 kHz to transmitter coil 1. Both transmitter coil 1 and receiver coil 2 are tuned to resonance at this frequency of 6 kHz. The two coils are placed in an overlapping position where the signals induced by transmitter coil 1 into receiver coil 2 are minimal.

A nulling signal source 4 derives from oscillator 3 a signal which is combined with the signal from the receiver coil 2, and adjusted in phase and amplitude so that the resultant signal is diminished to zero. This output will be a zero or null signal when no metal objects or ferromagnetic minerals are near the coils.

When metal objects or ferromagnetic minerals enter the magnetic flux field linking the coils, there will be a change in the signal of receiver coil 2. The signal obtained by combining the receiver coil 2 signal and the nulling signal will now be a sine wave signal representing only the effects of metal objects or ferromagnetic minerals near the coils.

The output thus obtained is applied to a pre-amplifier 5 where the signal is amplified sufficiently to operate the remaining elements of the circuit. Pre-amplifier 5 does not need to be of special design, since it is required only to amplify the sine wave signal without causing distortion of the waveform.

The output of pre-amplifier 5 is connected to the base of transistor 6 via coupling capacitor 7. A potentiometer 8 is connected from circuit ground to the voltage supply, and the wiper of the potentiometer is connected to the base of transistor 6 through resistor 9, thus providing an adjustable biasing voltage. The collector of transistor 6 is connected to the voltage supply, and the emitter is connected to circuit ground via resistor 10.

A center tapped winding 11 is provided (which may be contained within a 30×19 mm cup core); within this cup core is also contained a second winding 12, with this second winding being tuned to resonance at the circuit operating frequency of 6 kHz via capacitor 13. The first turn 14 of winding 11 is connected to the cathode of diode 15 via the parallel combination of resistor 16 and capacitor 17. The anode of diode 15 is connected to the cathode of diode 18. The anode of diode 18 is connected to the last turn 19 of winding 11 via the parallel combination of resistor 20 and capacitor 21.

The junction of diode 15 and diode 18 is connected to the junction of transistor 6 and resistor 10. The center tap 22 of winding 11 is connected to one terminal of a capacitor 23, with the second terminal of this capacitor being connected to circuit ground. Center tap 22 is also connected to the base of transistor 24, with the collector of this transistor being connected to the voltage supply, and the emitter being connected to circuit ground via resistor 25.

The junction of transistor 24 and resistor 25 is connected to amplifier 26. This is a DC level amplifier, and does not need to be of special design. It is required only to amplify changes in the voltage of capacitor 23, and to function as a low impedance source to drive the meter and audio stages which follow.

Amplifier 26 is connected to a meter 27 and audio stage 28. The audio stage being of a conventional type which provides a change of sound volume or frequency in response to a change in the DC level of the input signal.

A sine wave signal at the operating frequency is obtained from oscillator 3, and is applied via conductor 29 to one terminal of resistor 30, with the second terminal of this resistor being connected to circuit ground by capacitor 31. Conductor 29 is also connected to one terminal of capacitor 32, with the second terminal of this capacitor being connected to circuit ground by resistor 33. Potentiometer 34 is used to connect the junction of resistor 30, an capacitor 31, to the junction of capacitor 32 and resistor 33, thus forming a bridge network.

The wiper of potentiometer 34 is connected to the base of transistor 35 by capacitor 36. The base of transistor 35 is connected to the voltage supply by resistor 37 and to circuit ground by resistor 38. The emitter of transistor 35 is connected to circuit ground by resistor 39, and the collector is connected to the voltage supply by winding 40 (this winding may also be contained within a 30×19 mm cup core). Capacitor 41 is used to tune winding 40 to resonance at the operating frequency of 6 kHz.

Capacitor 42 is used to connect the junction of transistor 35, and winding 40, to one terminal of resistor 43, with the second terminal of this resistor being connected to circuit ground by capacitor 44. Capacitor 42 is also connected to one terminal of capacitor 45, with the second terminal of this capacitor being connected to circuit ground by resistor 46. Potentiometer 47 is used to connect the junction of resistor 43, and capacitor 44, to the junction of capacitor 45 and resistor 46, thus forming a bridge network.

The wiper of potentiometer 47 is connected to the base of transistor 48 by capacitor 49. The base of transistor 48 is connected to the voltage supply by resistor 50, and to circuit ground by resistor 51. The emitter of transistor 48 is connected to circuit ground by resistor 52, and the collector is connected to the voltage supply through winding 12.

The values of the various components may, of course, vary; however, the following components have been found to satisfactorily operate:

| | | |
|---|---|---|
| 6 | transistor | 2N5828A |
| 7 | capacitor | 1μf |
| 8 | potentiometer | 5K |
| 9 | resistor | 15K |
| 10 | resistor | 2.7K |
| 11 | center tapped winding | 100 turns |
| 12 | winding | 50 turns |
| 15 | diode | 1N4148 |
| 16 | resistor | 22K |
| 17 | capacitor | 5μf |
| 18 | diode | 1N4148 |
| 20 | resistor | 22K |
| 21 | capacitor | 5μf |
| 23 | capacitor | 15μf |
| 24 | transistor | 2N5828A |
| 25 | resistor | 2.7K |
| 30 | resistor | 2.7K |
| 31 | capacitor | .01μf |
| 32 | capacitor | .01μf |
| 33 | resistor | 2.7K |
| 34 | potentiometer | 25K |
| 35 | transistor | 2N5828A |
| 36 | capacitor | 1μf |
| 37 | resistor | 470K |
| 38 | resistor | 100K |
| 39 | resistor | 1K |
| 40 | winding | 50 turns |
| 42 | capacitor | 1μf |
| 43 | resistor | 2.7K |
| 44 | capacitor | .01μf |
| 45 | capacitor | .01μf |
| 46 | resistor | 2.7K |
| 47 | potentiometer | 25K |
| 48 | transistor | 2N5828A |
| 49 | capacitor | 1μf |
| 50 | resistor | 470K |
| 51 | resistor | 100K |
| 52 | resistor | 1K |
| | voltage supply | +6 volts |

The operation of the circuit so constructed will now be described. A signal is obtained from oscillator 3, being a sine wave at the operating frequency of 6 kHz, and in the system incorporating the above values being of 4 volts peak to peak amplitude; this signal is applied to the bridge network containing potentiometer 34. The phase of the signal at the junction of resistor 30, and capacitor 31 lags the applied signal by 45° and the phase of the signal at the junction of capacitor 32 and resistor 33 leads the applied signal by 45°. With potentiometer 34 connected from the junction with the lagging phase angle, to the junction with the leading phase angle, a signal may be obtained at the wiper of the potentiometer, and the phase of this signal may be adjusted through a range of 90° (±45°).

The signal obtained at the wiper of potentiometer 34 is applied through capacitor 36 to the base of transistor 35 with biasing for this transistor being provided by resistor 37 and resistor 38. The emitter of transistor 35 is connected to circuit ground through resistor 39, and the collector is connected to the +6 volt supply by winding 40, with this winding being tuned to resonance at the operating frequency of 6 kHz by capacitor 41. Thus connected, transistor 35 serves to restore the amplitude of the phase shifted signal, and to provide a low impedance source to drive the following stage. The parallel resonant circuit composed of winding 40, and capacitor 41 is used to insure that the waveform of the output will be sinusoidal.

The output signal of the junction of transistor 35 and winding 40 will be a sine wave, and is applied to the bridge network containing potentiometer 47 by means of capacitor 42. The phase of the signal at the junction of resistor 43, and capacitor 44, lags the applied signal by 45°, and the phase of the signal at the junction of capacitor 45, and resistor 46 leads the applied signal by 45°. With potentiometer 47 connected from the junction with the lagging phase angle to the junction with the leading phase angle, a signal may be obtained at the wiper of the potentiometer, and the phase of this signal may be adjusted through a range of 90° (±45°).

Since the phase shift of the signal at the wiper of potentiometer 34 may be adjusted through a range of 90°, and the phase shift of the signal at the wiper of potentiometer 47 may be adjusted through a range of 90°, the total adjustment available by using both potentiometers covers a range of 180°. The phase shift network 60, including both of the previously described bridge networks, therefore provides a means for shifting the phase of the oscillator signal.

The signal obtained at the wiper of potentiometer 47 is applied through capacitor 49 to the base of transistor 48, with biasing for this transistor being supplied by resistor 50 and resistor 51. The emitter of transistor 48 is connected to circuit ground through resistor 52, and the collector is connected to the +6 volts supply through winding 12. Winding 12 is tuned at the circuit operating frequency by capacitor 13, and so the sine wave signal applied to the base of transistor 48 appears across the parallel resonant circuit composed of winding 12, and capacitor 13, in the circuit of the embodiment of FIG. 1 having the above components, the signal will be 3 volts peak to peak amplitude.

Thus, it can be seen that a sine wave signal at the operating frequency of 6 kHz appears across winding 12, with this signal being shifted in phase relative to the signal of oscillator 3 by an amount determined by the adjustment of potentiometer 34 and potentiometer 47. (It should be noted that a significant phase shift does not occur across capacitor 36, capacitor 42, or capacitor 49, since these capacitors are of large value.)

The signal of winding 12 appears across winding 11 with the amplitude of the signal of winding 11 being greater than that of winding 12. The first and last turns of winding 11 are connected together by the series connected combination of resistor 16, diode 15, diode 18, and resistor 20. Conduction through this combination of components occurs during the time when the last turn 19 of winding 11 is positive with respect to the first turn 14. Capacitor 17 is placed in parallel with resistor 16, and capacitor 21 is placed in parallel with resistor 20 to insure that conduction occurs only during the brief period when the voltage between the first and last turns of winding 11 is at or nearly at a maximum.

The adjustment of the signal amplitude appearing between the terminals of winding 11 is not critical with this arrangement of components, since capacitor 17, and capacitor 21 will automatically charge to a voltage where conduction occurs through diode 15, and diode 18, only during a brief period when the signal amplitude is at or nearly at a maximum. During the time when conduction occurs through diode 15, and diode 18, the voltage at the junction of the diodes will be the same as the voltage of the center tap 22 of winding 11. That portion of the circuit shown in broken line 61 may be considered a switch that "closes" at a predetermined time during each cycle to apply the voltage at the junction of diodes 15 and 18 to the center tap 22.

Oscillator 3 supplies a sine wave signal at the frequency of 6 kHz to a tuned transmitter coil 1 which, in the embodiment chosen for illustration, is four volts peak-to-peak. Receiver coil 2 is tuned to resonance at the frequency of the transmitter coil 1, and is placed in a position, overlapping the transmitter coil 1, where the induced signal is minimal. A null signal source 4 derives from oscillator 3 a signal, and provides means of adjusting the signal in phase and amplitude, this null signal source being of the type commonly used in transmitter receiver detection systems.

The signal thus obtained is added to the signal of the receiver coil 2, and adjusted so that the final signal is diminished to zero with no metal object being in proximity to the search head. When metal objects or ferromagnetic minerals are placed near the search head, the final signal will be a sine wave representing only the effect of these materials. The signal thus obtained is amplified by means of pre-amplifier 5, this being a conventional AC amplifier, and is required only to amplify the sine wave input signal without distorting the waveform. The output signal of pre-amplifier 5 is applied via capacitor 7 to the base of transistor 6. Biasing for transistor 6 is provided by the voltage obtained at the wiper of potentiometer 8, applied through resistor 9 with the position of wiper of potentiometer 8 determining the biasing voltage applied to the base of transistor 6; this control provides a means for adjusting the audio signal level and the meter position.

The signal of pre-amplifier 5 applied through capacitor 7 will be imposed upon the DC voltage level supplied by potentiometer 8 and applied to the base of transistor 6. Since transistor 6 is in an emitter follower configuration, the AC signal appearing at the junction of the emitter of transistor 6 and resistor 10 will be identical to the AC signal applied to the base, and the DC level will be slightly lower than the DC voltage supplied by potentiometer 8 through resistor 9. Transistor 6 thus functions as a low impedance source, supplying an AC signal imposed upon a DC level which is determined by the adjustment of potentiometer 8.

As described previously, the portion of the circuit contained within broken line 61 functions an an electrical switch which closes at a predetermined time during each cycle. The electrical switching action thus afforded causes the voltage at the center tap 22 of winding 11 to be clamped to the voltage at the junction of diode 15 and diode 18 during the brief instant when conduction occurs through diodes 15 and 18.

The ungrounded terminal of capacitor 23 is connected to center tap 22; the junction of diode 15 and diode 18 is connected to the emitter of transistor 6. By this means, a voltage is caused to occur across capacitor 23, with this voltage being determined by the instantaneous value of the AC signal appearing at the emitter of transistor 6 at the time when switching occurs, and also by the adjustment of potentiometer 8.

The voltage level of capacitor 23 is applied to the base of transistor 24 which is connected in the emitter follower configuration. The output of this stage is the junction of the emitter of transistor 24 and resistor 25; the stage is used to provide a low impedance source to drive the amplifier 26 which follows. Amplifier 26 is a DC level amplifier, used to amplify the change in signal level, and thus provide increased sensitivity and response. This amplifier is of conventional design, with the only requirement being the ability to avoid ringing or recoil effects following response to a change in signal level.

The output of amplifier 26 is applied to a meter 27 and audio stage 28. The audio stage should be of the conventional prior art type which provides a change in volume, or frequency, in response to a change in the DC level of the input signal.

It is necessary to maintain meter 27 and audio stage 28 within their useful operating range; to achieve this, potentiometer 8 is used to adjust the quiescent level of the signal applied to meter 27 and audio stage 28.

The circuit just described may be adjusted to operate either as a selective detector, or as a ground neutralizing detector, by causing switching to occur at the proper instant of each cycle of the waveform supplied by transistor 6.

To attain ground neutralized operation, the instant of switching should be adjusted to occur at a 90° lagging phase angle to the signal caused by a sample of magnetite positioned near the search head.

Figure 2:
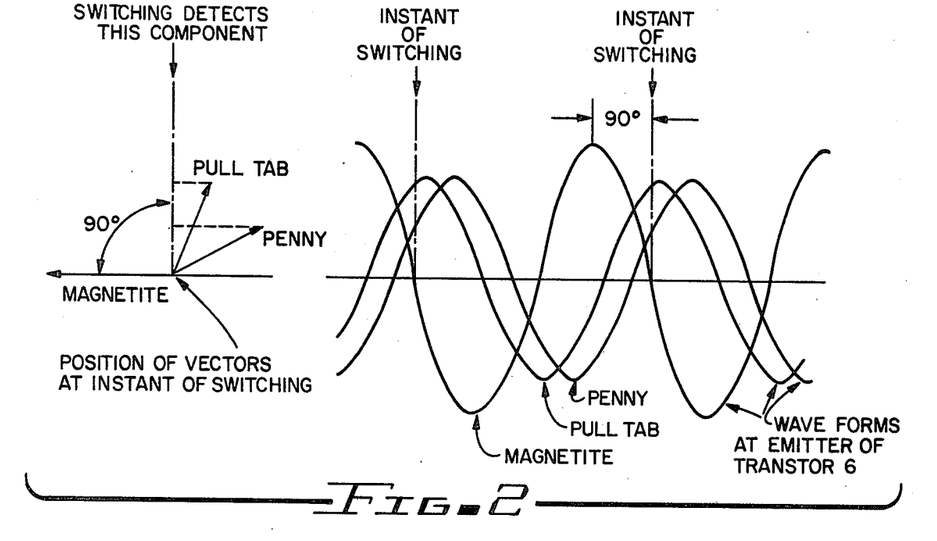
FIG. 2 is a diagram of vectors and corresponding waveforms useful in describing the metal detector circuit of the present invention.

Referring to FIG. 2, the phasor diagram and graph of the waveform supplied by transistor 6 illustrate the phasing which should exist between the signal caused by magnetite and the instant of switching in order to obtain ground neutralizing operation. It should be noted that switching occurs during the negative going, zero crossing instant of the magnetite induced waveform. As the graph of the waveforms indicates, there will be a substantial component of the waveforms of the penny and the pull tab present during the instant of switching, so that the signals of these objects will be detected and cause a change in the voltage appearing between the terminals of capacitor 23.

The phase shifting network 60 is used to adjust the phasing between the sine wave signal supplied by transistor 6 and the instant of switching. To do this, a sample of magnetite or black sand is positioned near the surface of the search head, thereby causing a sine wave signal to appear at the junction of transistor 6, and resistor 10. Using a dual trace oscilloscope (not shown), the oscilloscope ground is connected to circuit ground, and the first input of the oscilloscope is connected to the junction of the emitter of transistor 6 and resistor 10, and set to trigger on this signal.

Thus connected, the waveform displayed will represent the signal supplied by the receiver coil in proximity to magnetite as it appears at the emitter of transistor 6 (magnetite waveform of FIG. 2).

The second input of the oscilloscope is connected to the last turn 19 of winding 11. Thus connected, the waveform displayed will represent the signal of the sine wave voltage appearing at terminal 19 of the winding 11 of the switching circuit. A small flattened region will be noted at the instant of the peak positive alternation of the waveform; the flattened region represents the instant of switching. Using potentiometer 34 and potentiometer 47, the instant of switching should be adjusted to occur simultaneously with the negative going, zero crossing instant of the waveform appearing at the emitter of transistor 6. Since the range of adjustment provided by the potentiometers is 180° or one-half cycle, the adjustment needed may lie outside of this range. In this case, the connections to the winding 12 should be reversed. The range of adjustment should then contain the setting where switching occurs at the correct instant. Since a final adjustment will be required to suit actual ground conditions, either potentiometer 34 or potentiometer 47 should be adjustable externally to any enclosure used to contain the circuitry.

As an alternative, switching may be adjusted to occur at a 90° leading phase angle to the signal caused by magnetite in place of the 90° lagging angle just described. To do this, switching should occur at the positive going, zero crossing instant of the waveform. In this case, the operational characteristics of the circuit will remain the same, except that the polarity of the response to metal objects will be reversed.

Figure 3:
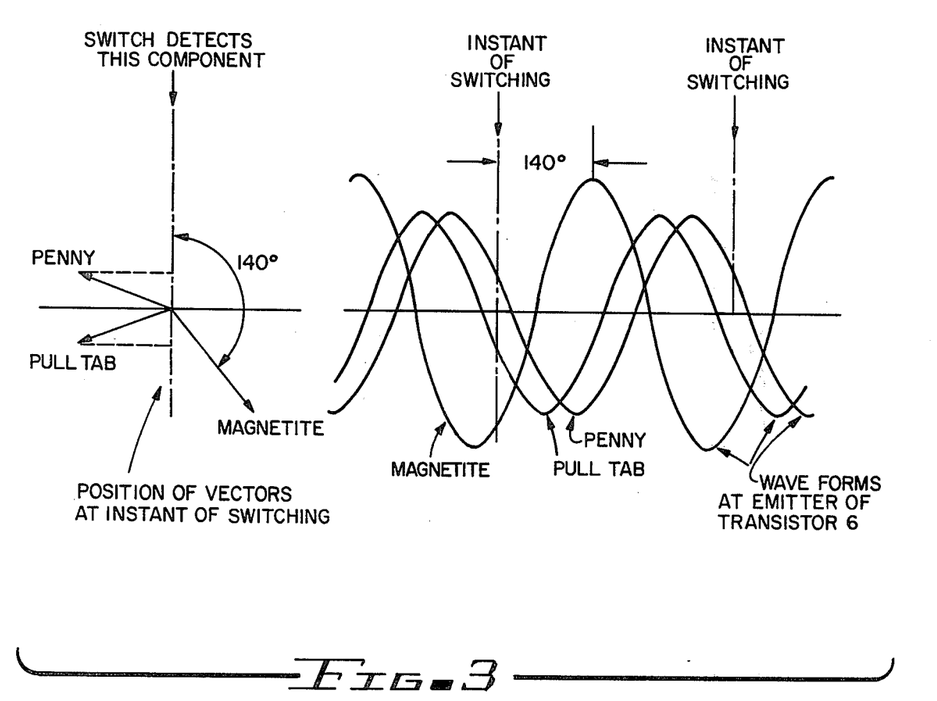
FIG. 3 is a diagram of vectors and corresponding waveforms useful in describing the metal detector circuit of the present invention.

To attain selective operation for the selective detection of high Q and low Q objects, such as copper coins and aluminum pull tabs, the instant of switching may be adjusted to occur at a 140° leading phase angle to the signal caused by a sample of magnetite positioned near the search head.

In FIG. 3, the phasor diagram and graph of the waveform illustrate the phasing which should exist between the signal caused by magnetite, and the instant of switching in order to obtain this selective operation. It should be noted that this phasing is used to obtain equal responses of opposite polarity for the signals of the penny and the pull tab. The selective characteristics may be changed by changing the phase angle to meet other requirements.

As was the case with ground neutralized operation, the instant of switching is adjusted by means of potentiometer 34 and potentiometer 47. With the sample of magnetite positioned near the search head, and the oscilloscope connected as before, switching should be adjusted to occur at a 140° leading angle to the peak positive instant of the waveform appearing at the emitter of transistor 6.

As an alternative, switching may be adjusted to occur at a 40° lagging phase angle to the signal induced by magnetite, this angle being diametrically opposite to the 140° leading angle. In this case, the operational characteristic of the circuit will remain the same, except that the polarity of the response to the penny and the pull tab will be reversed.

The concept of the present invention may be employed in a metal detector system incorporating a selective detector circuit, and a ground neutralizing detector circuit. A block diagram of such a system is shown in FIG. 4, wherein a clamping circuit is utilized, and wherein the clamping circuit restrains the response of the selective detector circuit, except during those times when the clamping circuit is deactivated by the ground neutralizing detector circuit.

Figure 4:
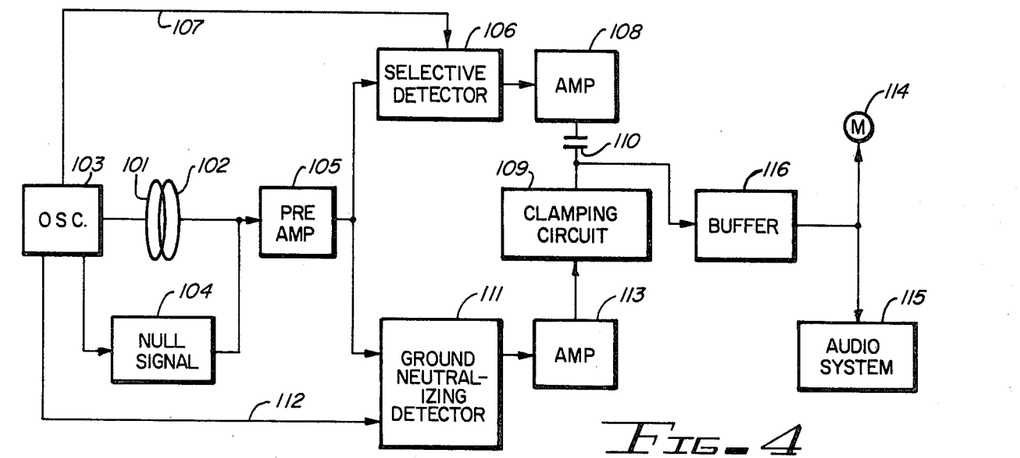
FIG. 4 is a schematic block diagram of a metal detector system utilizing the metal detector circuits of the present invention.

Referring now to FIG. 4, a transmitter coil 101, corresponding to the transmitter coil 1 of FIG. 1, and a receiver coil 102, corresponding to the receiver coil 2 of FIG. 1, are placed in an overlapping position. Oscillator 103, corresponding to oscillator 3 of FIG. 1, supplies a sine wave signal with a frequency of 6 kHz to transmitter coil 101. As was done before, the coils are positioned so that the received signal is minimal, and a nulling signal source 104, corresponding to nulling signal source 4 of FIG. 1, is used to diminish the signal of receiver coil 102 to zero. The output thus obtained is applied to a preamplifier 105, corresponding to the pre-amplifier 5 of FIG. 1, where the signals are amplified sufficiently to operate the remaining elements of the circuit. Specifically, the output of pre-amplifier 105 of FIG. 4, corresponds to the output of pre-amplifier 5 in FIG. 1.

The output of pre-amplifier 105 is connected to a selective detector circuit 106. Selective detector 106 comprises the circuit of FIG. 1, but does not include the transmitter coil 1, receiver coil 2, oscillator 3, null signal source 4, or pre-amplifier 5 of FIG. 1, nor does it include the amplifier 26, meter 27, audio system 28, or conductor 29 of FIG. 1.

Pre-amplifier 105 is connected to selective detector 106 via the coupling capacitor contained within selection detector 106 which is equivalent to capacitor 7 of FIG. 1. A reference signal is provided over conductor 107 (corresponding to conductor 29 of FIG. 1) for the operation of selective detector 106, and is a sine wave signal supplied by oscillator 103.

Selective detector 106 should be adjusted, as described previously, to detect the component of the received signal where the effect of high Q objects in proximity to the search head will be opposite to the effect of low Q objects near the search head.

For the system of FIG. 4, operating at 6 kHz, the selective detector 106 should detect that component of the received signal which is at a 140° leading phase angle to the signal caused by a sample of magnetite placed near the search head; when detection occurs at this angle, the effects of a penny and a pull tab will be approximately equal and opposite. The output of the selective detector 106 is a DC (direct current) voltage level. The response of the selective detector 106 to high Q and low Q objects is a change in the output voltage level, with the two classes of objects producing changes of opposite polarity.

The output of selective detector 106 is connected to amplifier 108, a DC level amplifier. The function of amplifier 108 is to provide increased sensitivity and response to weak signals. In addition, amplifier 108 should have a low output inpedance to operate into the clamping circuit 109 to be described. Amplifier 108 is connected to clamping circuit 109 through 15 µf capacitor 110.

In addition to being connected to selective detector 106, the output of pre-amplifier 105 is also connected to ground neutralizing detector circuit 111. The circuit of ground neutralizing detector 111 is identical to the circuit of selective detector 106, however ground neutralizing detector 111 is adjusted to exclude the response to ferromagnetic minerals.

Pre-amplifier 105 is connected to ground neutralizing detector 111 via the coupling capacitor contained within ground neutralizing detector 111 which is equivalent to capacitor 7 of FIG. 1. A reference signal is provided over conductor 112 (corresponding to conductor 29 of FIG. 1) for the operation of ground neutralizing detector 111, and is a sine wave signal supplied by oscillator 103.

Ground neutralizing detector 111 should be adjusted, as described previously, to detect the component of the received signal where the effect of ferromagnetic minerals in proximity to the search head will be minimal. To accomplish this, the circuit should detect that component of the received signal which is at a 90° lagging phase angle to the signal caused by a sample of magnetite placed near the search head. The output of the ground neutralizing detector 111 is a DC voltage level. The response of the ground neutralizing detector 111 to all metal objects is a change of the same polarity in the output voltage level.

The output of ground neutralizing detector 111 is connected to amplifier 113, a DC level amplifier. The function of amplifier 113 is to provide increased sensitivity and response to weak signals. In addition, the output of amplifier 113 should not incur recoil or ringing effects after a metal object has passed through the field of the search head. To accomplish this, suitable damping circuits may be incorporated into the design of amplifier 113. Amplifier 113 is connected to clamping circuit 109.

Clamping circuit 109 is used to clamp the output signals of selective detector circuit 106 to a fixed voltage level except during those times when a change in signal level occurs in the output of ground neutralizing detector 111. The junction of capacitor 110 and clamping circuit 109 is connected to meter 114 and audio system 115 through buffer 116. Meter 114 and audio system 115 are used to provide indication of the response of the system to metal objects in proximity to the search head, while buffer 116 is used to isolate the clamping circuit 109 from signals generated by audio system 115.

Figure 5:
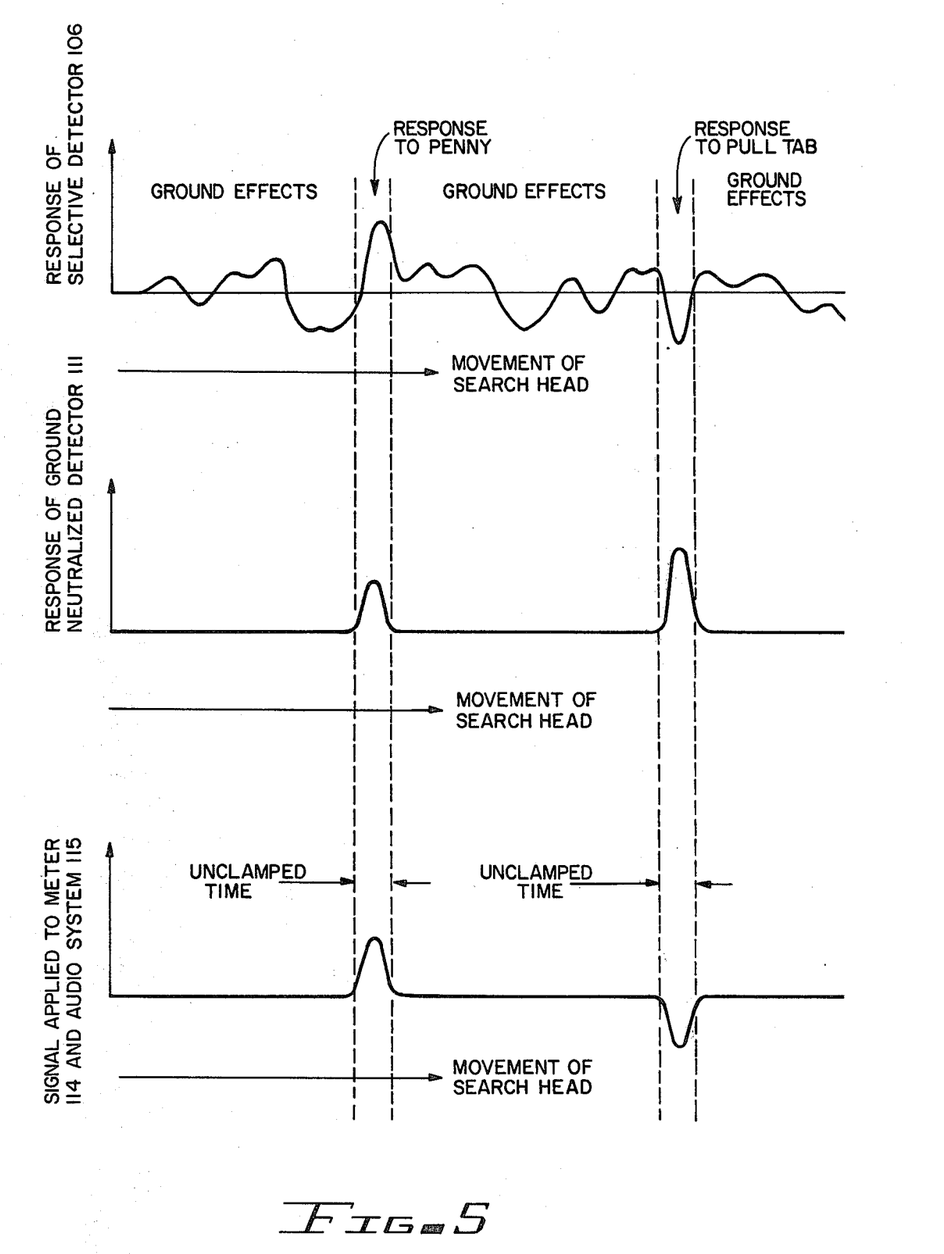
FIG. 5 is an illustration showing waveforms useful in describing the embodiment of FIG. 4.

The operation of the system of the embodiment will now be described. FIG. 5 contains waveforms of the responses of the system as the search head is moved over mineralized ground containing a penny (high Q object), and an aluminum pull tab (low Q object). The response of the output of the selective detector 106 is shown in the upper waveform of FIG. 5. It can be seen that the penny causes a positive going signal of short duration, and the pull tab causes a negative going response of short duration. In addition, the mineralized ground will produce random fluctuations in the output of selective detector 106 which will be similar to the responses to the metal objects.

The center waveform of FIG. 5 shows the responses of the output of ground neutralizing detector 111 to the same situation. Here it can be seen that both the penny and the pull tab produce positive going signals, while the response caused by ground effects is insignificant.

The lower waveform of FIG. 5 is of the signal of the selective detector 106, with ground effects removed by the clamping circuit 109, which is applied to the meter 114 and audio system 115. During the times when metal objects cause the ground neutralizing circuit 111 to supply a signal, the clamping circuit 109 will be deactivated, and the response of the selective detector 106 will be transmitted to the meter 114 and audio system 115. Since the clamp, when deactivated, does not oppose a signal change of either polarity, both the positive going response caused by the penny, and the negative going response caused by the pull tab will be transmitted to the meter 114 and audio system 115. During the time when no metal object is near the search head, the clamping circuit 109 will block changes in the output of the selective detector 106 so that the response of the selective detector to ground effects will not be transmitted to meter 114 and audio system 115. Thus, meter 114 and audio system 115 will provide indication of the response to metal objects while excluding the response to ground effects.

Capacitive coupling, provided by capacitor 110 in FIG. 4, is used in place of resistive or direct coupling between amplifier 108 and clamping circuit 109. Therefore, signal level changes in the output of amplifier 108 which occur during times when clamping circuit 109 is in the ON state (clamped), will result in changes in the voltage differential across capacitor 110. Signal level changes in the output of amplifier 108 which occur during times when clamping circuit 109 is deactivated (unclamped) will be transmitted to meter 114 and audio system 115 via buffer 116 with the voltage differential across capacitor 110 remaining constant. Therefore, meter 114 and audio system 115 will provide indications only of signal level changes which occur during unclamped time, and will not be influenced by signal level changes which occur prior to unclamping. By this means, the correct selective response is assured in the situation where the brief response of the selective detector 106 to a metal object occurs coincidentally with a longer duration response in opposition caused by mineralized ground.

A detailed description of the clamping circuit 109 will now be provided. It has been found that if the base to emitter junction of a transistor is in forward conduction, and the transistor is in saturation, then the collector will clamp to the emitter voltage level and that the collector, so clamped, will oppose or block an applied signal of either polarity. If forward conduction base to emitter ceases, a signal of either polarity applied to the collector will not be opposed or blocked. It should be understood that this is an unconventional application of a transistor, the collector is connected only to the applied signal source. The transistor is, in effect, being used as a switch, with collector to emitter conductance being controlled by base to emitter current.

Figure 6:
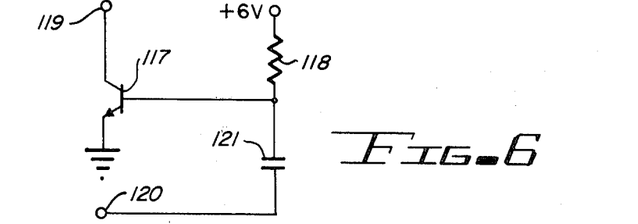
FIG. 6 is a schematic circuit diagram of a simplified clamping circuit for use in the embodiment of FIG. 4.

Referring now to FIG. 6, a schematic circuit diagram of a clamping circuit having a single transistor 117 is shown utilizing the principle just described. Current to maintain the base to emitter junction of transistor 117 in forward conduction is supplied by resistor 118 connected to a +6 volt source. Terminal 119 is connected to the collector of transistor 117. The junction of capacitor 110 of FIG. 4 and buffer 116 of FIG. 4 is then connected to terminal 119. The output of amplifier 113 of FIG. 4 driven by ground neutralizing detector 111 of FIG. 4 is connected to terminal 120, and then is coupled by capacitor 121 to the base of transistor 117.

Proper operation of the clamping circuit of FIG. 6 requires that a negative going signal be applied to terminal 120 to cause unclamping. For this reason, the design of amplifier 113 should be such that a signal of negative polarity is applied to terminal 120 when a metal object passes through the field of the search head of the detector.

The operation of the circuit, so connected, will now be described. Current supplied by resistor 118 to the base of transistor 117 will maintain the transistor in the ON or clamped state, unless a negative going signal is applied to terminal 120. Such a negative going signal, applied by capacitor 121 to the base of transistor 117 will result in a momentary loss of forward conduction, base to emitter, causing transistor 117 to be in the OFF or unclamped state. Thus, in the absence of a negative going signal applied to terminal 120, transistor 117 will be in the clamped state, and the signals of amplifier 108 will be dissipated across capacitor 110 and will not appear at terminal 119. However, when a negative going signal is applied to terminal 120, transistor 117 will be in the unclamped state, and the signals of amplifier 108 will appear at terminal 119.

The circuit of FIG. 6, operating as described, will therefore prevent the signals of the selective detector 106 from appearing at terminal 119, unless the ground neutralizing detector 111 causes a negative going signal to be applied to terminal 120. Suitable values for the components of FIG. 6 are as follows:

| 117 transistor | 2N5828A |
| 118 resistor | 47K |
| 121 capacitor | 100μf |

Figure 7:
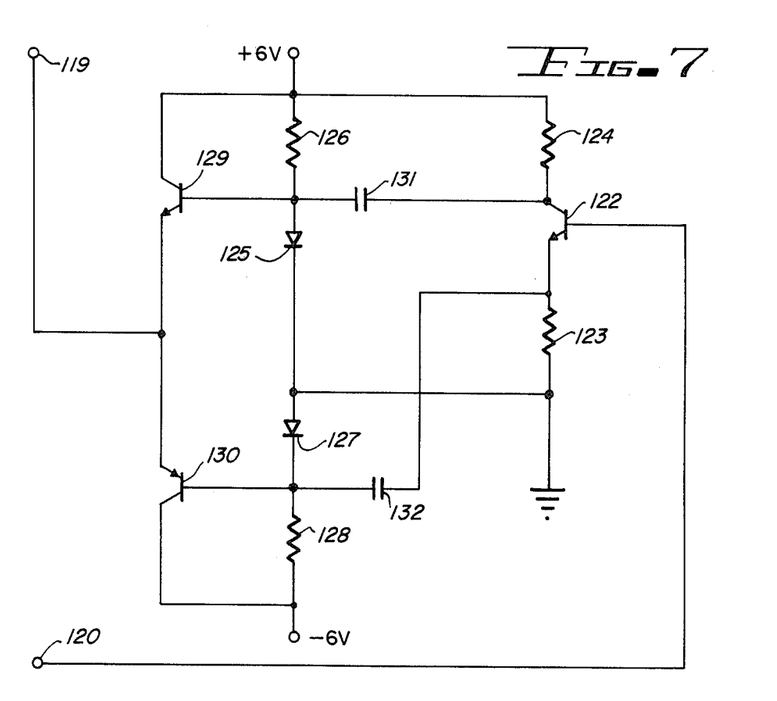
FIG. 7 is a schematic circuit diagram of an alternative clamping circuit for use in the embodiment of FIG. 4.

Improved performance and smoother operation will result if the clamping circuit of FIG. 6 is replaced with a clamping and limiting circuit, as shown in FIG. 7. In this type of circuit, the signals of the selective detector 106, which are supplied to the meter and audio system during unclamped time, are limited by the amplitude of the signals supplied by the ground neutralized detector 111. FIG. 7 is a schematic of such a clamping and limiting circuit. Here, the junction of capacitor 110 of FIG. 4 and buffer 116 of FIG. 4 is connected to terminal 119. Terminal 120 is connected to the output of amplifier 113 (this is the same arrangement that was used in the schematic of FIG. 6). The base of transistor 122 is directly connected to terminal 120. The emitter of transistor 122 is connected to circuit ground by resistor 123 and the collector is connected to a +6 volt source by resistor 124. The purpose of transistor 122 is to provide equal output signals of opposite polarity, in response to input signals applied to terminal 120. The cathode of diode 125 is connected to circuit ground. Diode 125 is held in conduction by resistor 126, connected from the anode of diode 125 to the +6 volt source. Thus connected, there is provided at the junction of the anode of diode 125 and resistor 126 a voltage with the voltage being positive with respect to circuit ground. The anode of diode 127 is connected to circuit ground. Diode 127 is held in conduction by resistor 128, connected from the cathode of diode 127 to a −6 volt source. Thus, there is provided at the junction of the cathode of diode 127 and resistor 128, a voltage, with the voltage being negative with respect to circuit ground. The collector of a transistor 129 is connected to a +6 volt source, and the base is connected to the junction of diode 125 and resistor 126. The collector of a transistor 130 is connected to the −6 volt source, and the base is connected to the junction of diode 127 and resistor 128. The emitter of transistor 129 is connected to the emitter of transistor 130. With the base of transistor 129 being held positive with respect to circuit ground by the voltage across diode 125, and with the base of transistor 130 being held negative with respect to circuit ground by the voltage across diode 127, the voltage at the junction of the emitters of transistor 129 and transistor 130 is established at the level of circuit ground. It should be noted that transistor 129 must be of the NPN type to conduct on the positive voltage supplied by diode 125, and that transistor 130 must be of the PNP type to conduct on the negative voltage supplied by diode 127.

The junction of the emitters of transistor 129 and transistor 130 is connected to terminal 119. Capacitor 131 is used to couple the junction of transistor 122 and resistor 124 to the junction of diode 125 and resistor 126. Capacitor 132 is used to couple the junction of transistor 122 and resistor 123 to the junction of diode 127 and resistor 128.

Proper operation of this circuit requires that a positive going signal be applied to terminal 120 to cause unclamping. For this reason, the design of amplifier 113 should be such that a signal of positive polarity is applied to terminal 120 when a metal object passes through the field of the search head of the detector. In addition, the DC level at terminal 120 should be positive with respect to circuit ground in order to hold transistor 122 in conduction.

The operation of the circuit connected as described will now be explained. While the voltage at terminal 120 remains constant, current through resistor 126 will hold diode 125 in conduction, and current through resistor 128 will hold diode 127 in conduction. The voltage appearing across diode 125 applied to the base of transistor 129, and the voltage appearing across diode 127, applied to the base of transistor 130 will establish the voltage at the junction of the emitter of transistor 129 and the emitter of transistor 130 at the level of circuit ground.

While in this state, signals applied to terminal 119 will be clamped to circuit ground. However, if a positive going signal is applied to terminal 120, transistor 122 will cause a positive going signal to be applied to capacitor 132, and an equal negative going signal to be applied to capacitor 131. The negative signal applied by capacitor 131 to the base of transistor 129 will permit a negative going signal applied to terminal 119 to drive the emitter of transistor 129 negative with respect to circuit ground by an amount equal to, but not more than, the signal applied to the base of transistor 129. At the same time, the positive going signal applied by capacitor 132 to the base of transistor 130 will permit a positive going signal applied to terminal 119 to drive the emitter of transistor 130 positive with respect to circuit ground, by an amount equal to, but not more than, the signal applied to the base of transistor 130. Suitable values for the components of FIG. 7 are as follows:

| | |
|---|---|
| 122 transistor | 2N5828A |
| 123 resistor | 2.7K |
| 124 resistor | 2.7K |
| 125 diode | 1N 4148 |
| 126 resistor | 100K |
| 127 diode | 1N 4148 |
| 128 resistor | 100K |
| 129 transistor | 2N5828A |
| 130 transistor | 2N5087 |
| 131 capacitor | 100µf |
| 132 capacitor | 100µf |

The circuit of FIG. 7 operating as described, will therefore prevent the signals of the selective detector 106 from appearing at terminal 119, unless the ground neutralizing detector 111 causes a positive going signal to be applied to terminal 120; in the latter case, the change in signal level which may occur at terminal 119 will be limited by the amplitude of the signal applied to terminal 120.

It will be apparent that the clamping and limiting circuit of FIG. 7 could be replaced with a more complex circuit to provide more vigorous clamping action and reduced power consumption.

Although the system of the invention is described in connection with a search head of the transmitter receiver type, a search head containing a single coil used as both transmitter and receiver could be employed. In this case, a selective detector circuit of the present invention, and a ground neutralizing detector circuit of the present invention, would provide response to changes in the sine wave signal appearing at the terminals of the single coil. Then, in the manner previously described, a clamping circuit of the present invention, being controlled by the ground neutralized detector circuit, would remove the effects of ferromagnetic minerals from the output of the selective detector circuit.

I claim:

1. A metal detecting system for detecting metal objects near the surface of the earth comprising:
   a. an oscillator for generating an oscillator signal having a predetermined frequency;
   b. transmitting means connected to said oscillator;
   c. receiving means for receiving the signal transmitted by said transmitting means;
   d. a first detector circuit connected to said oscillator and to said receiving means, said first detector circuit responsive to the detection of a metal object for producing at an output thereof a first detection signal having a polarity depending upon the Q of the object being detected;
   e. a capacitor connected to said detector circuit to receive said first detection signal;
   f. indicator means connected to said capacitor on a side thereof opposite said detector circuit;
   g. a ground neutralizing detector circuit connected to said oscillator and to said receiving means, said ground neutralizing detector circuit responsive to the detection of a metal object, and adjusted to minimize the effects of ferromagnetic minerals, for producing a second detection signal;
   h. a clamping circuit connected to the junction of said capacitor and said indicator means for clamping the output of said first detector circuit and preventing said first detection signal from being transmitted to said indicator means; and
   i. said clamping circuit also connected to said ground neutralizing detector and responsive to said second detection signal for unclamping the output of said first detector circuit to permit said first detection signal to be applied to said indicator means.

2. The combination set forth in claim 1 wherein each of said first and ground neutralizing detector circuits include:
   a. a phase shifting circuit connected to said oscillator for generating a second signal having said frequency and having a predetermined phase shift relative to said oscillator signal;
   b. switching means connected to said receiving means, said switching means also connected to receive said second signal and connected to said indicator means; and
   c. said switching means responsive to a predetermined instantaneous amplitude of said second signal for momentarily coupling the signal from the receiving means to an output of the detector.

3. The combination set forth in claim 2 wherein said instantaneous amplitude is the maximum positive amplitude of said second signal.

4. The combination set forth in claim 2 wherein said phase shifting circuit of each of said detectors is manually adjustable to permit selection of a desired phase shift as the predetermined phase shift.

5. The combination set forth in claim 2 wherein the phase shifting circuit of said ground neutralizing detector circuit is adjusted so that said predetermined instantaneous amplitude of said ground neutralizing signal in said second detector circuit corresponds in time to the instant that a waveform of a received signal resulting from the detection of ferromagnetic minerals passes through zero.

6. The combination set forth in claim 5 wherein the phase shifting circuit of said first detector circuit is adjusted so that the predetermined instantaneous amplitude of said second signal corresponds in time to an instant 140° prior to the occurrence of the maximum positive amplitude of the waveform of a received signal resulting from the detection of ferromagnetic minerals.

7. The combination set forth in claim 5 wherein the phase shifting circuit of said first detector circuit is adjusted so that said predetermined instantaneous amplitude of said second signal corresponds in time to an instant 40° after the occurence of the maximum positive amplitude of a waveform of a received signal resulting from the detection of ferromagnetic minerals.

* * * * *